Nov. 30, 1948.  D. S. HERSEY  2,455,251
CONSTANT THRUST FAN
Filed Oct. 16, 1945  2 Sheets-Sheet 1

INVENTOR.
DONALD S. HERSEY
BY
ATTORNEY

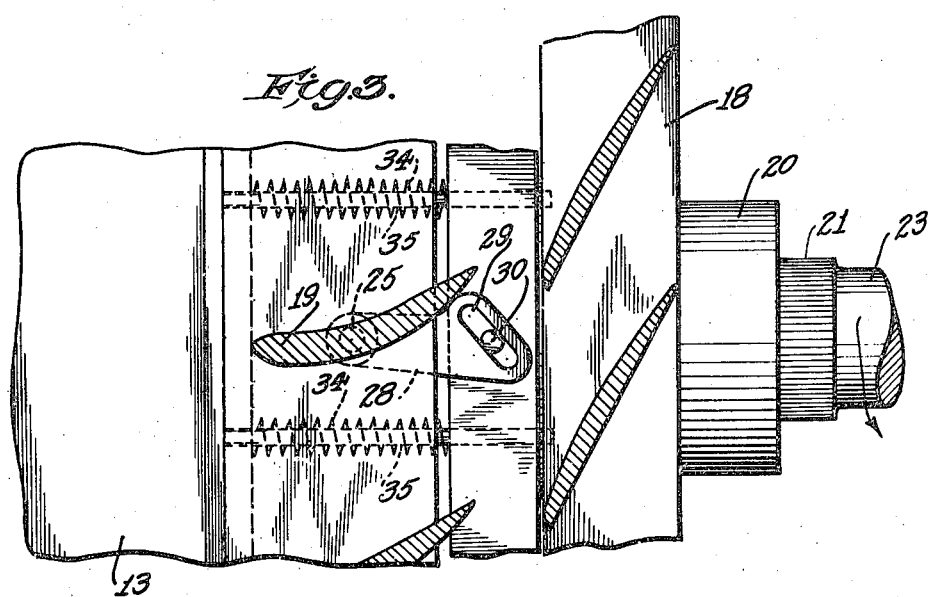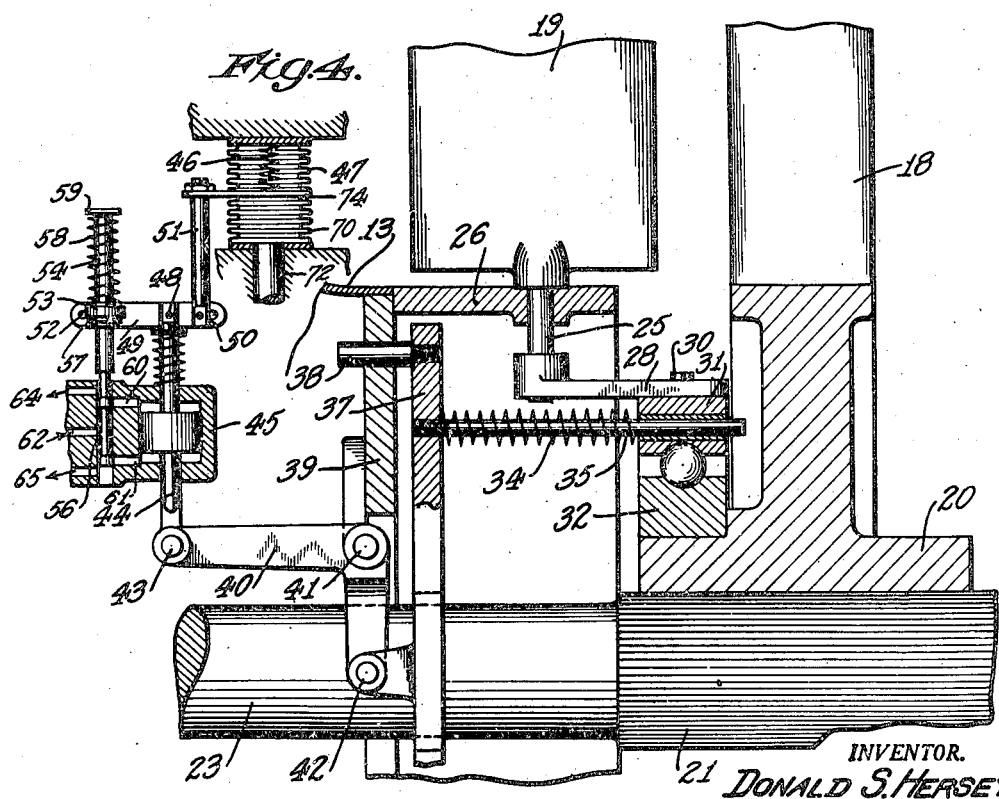

Patented Nov. 30, 1948

2,455,251

UNITED STATES PATENT OFFICE 2,455,251

CONSTANT THRUST FAN

Donald S. Hersey, East Hartford, Conn., assignor to United Aircraft Corporation, East Hartford, Conn., a corporation of Delaware Application October 16, 1945, Serial No. 622,507

9 Claims. (Cl. 230—114)

This invention relates to cooling fans for air-cooled aircraft engines and has for its object to provide a novel and improved device of this type.

Another object of the invention is to provide improved means for varying the effective pitch of an engine cooling fan in response to variations in the thrust produced by said fan.

A further object is to provide a control mechanism for an aircraft engine cooling fan which is responsive to variations in fan thrust and which will automatically control fan thrust in accordance with changes in atmospheric pressure resulting from changes in aircraft altitude.

Still another object is to provide a fan control mechanism of the foregoing type having novel and improved details of construction and features of operation.

Various and other objects and advantages will be apparent as the nature of the invention is more fully disclosed.

An important feature of the invention, as applied to air-cooled aircraft engines, resides in the provision of means for unloading the engine cooling fan as the aircraft altitude decreases. To illustrate, if an engine cooling fan is designed with fixed pitch blades and contravanes to produce a ten inch wind gauge pressure rise (or thrust) at 40,000 feet, it may produce an excessively large pressure rise at sea level and consequently absorb a very large amount of the engine power. According to the present invention this difficulty is obviated by control of the effective fan angle, which, in one embodiment of the invention, holds the fan thrust or pressure rise constant regardless of variations in altitude.

It is also desirable to reduce the pressure rise created by the fan with a reduction in altitude and this may be accomplished, according to another embodiment of the invention, by providing a control mechanism which is responsive to atmospheric pressure for regulating the effective pitch of the fan so as to regulate pressure rise created by the fan in accordance with variations in altitude, providing greater pressure rise as the atmospheric pressure decreases or the altitude increases.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the drawings:

Fig. 3 is a transverse section taken on line 3—3 of Fig. 2; and

Fig. 4 is a schematic view illustrating a modification of the invention.

In the following description certain specific terms are used for convenience in referring to the various details of the invention. These terms, however, are to be interpreted as broadly as the state of the art will permit.

Figure 1:
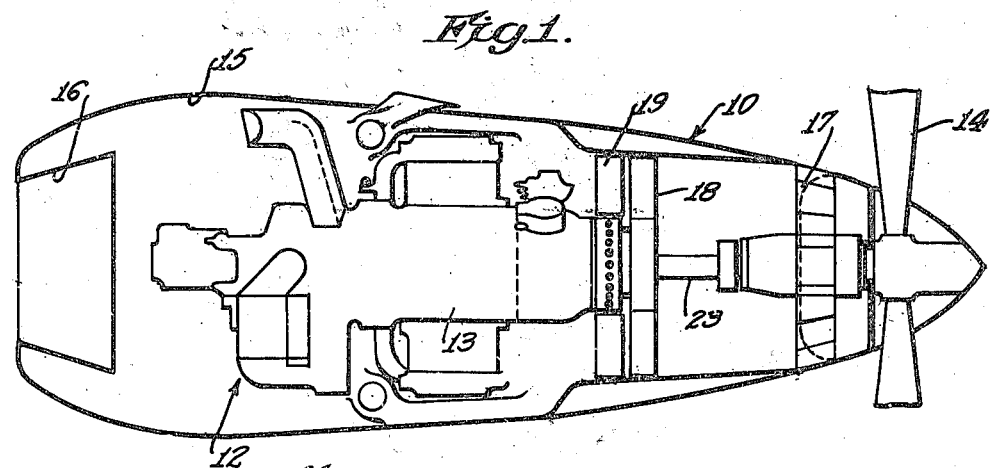
Figure 1 is a diagrammatic view of an air-cooled aircraft power plant including a cooling fan embodying the present invention.

In the drawing, Fig. 1 shows an engine nacelle 10 forming part of the fuselage of a pusher type airplane. The nacelle 10 contains a power plant 12 including engine 13 driving propeller 14, and is surrounded by cowl 15. Air inlet 16 and outlet flaps 17 provide for the passage of cooling air over the heat exchanging surfaces of engine 13.

According to a feature of the invention I provide a novel combination of fan 18 for boosting the flow of the cooling air, and air directing means or contravanes 19 for changing the relative velocity and direction of the airstream entering inlet 16 before it passes through the blades of fan 18. These air controlling elements are best shown in Figs. 2 and 3 of the drawings.

Figure 2:
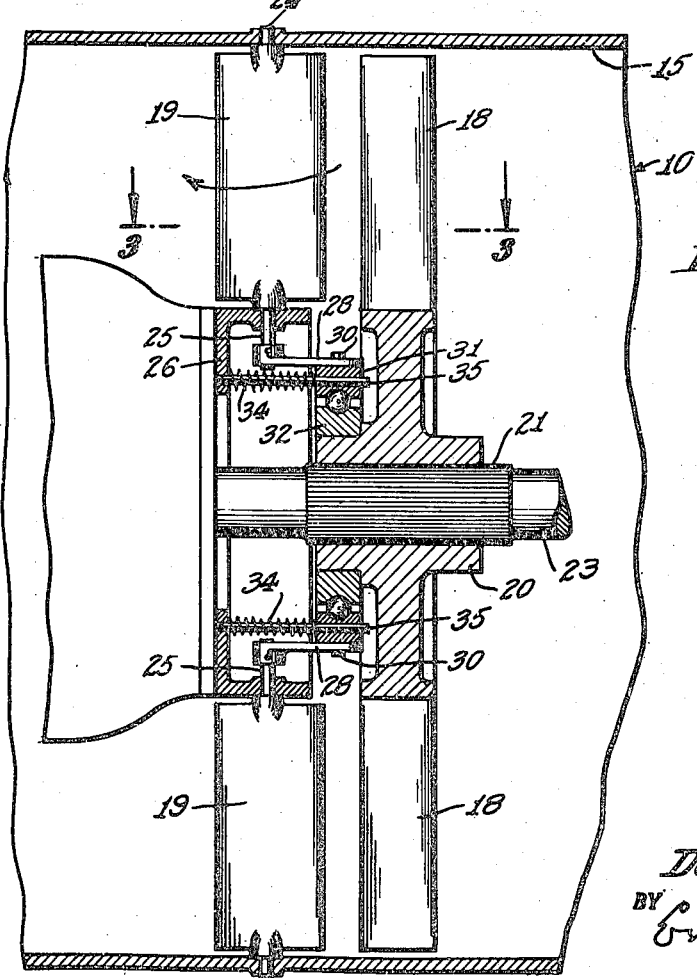
Fig. 2 is an enlarged longitudinal sectional view through the cooling fan and blade adjusting mechanism.

The blades of fan 18, fixed as to pitch, are carried by a hub 20 which is secured by longitudinal splines 21 of the drive shaft 23 of engine 13, as shown in Fig. 2. Hence the fan 18 rotates with the engine drive shaft 23 but is free to move longitudinally of said shaft 23 upon the splines 21.

The air directing means or contravanes 19, mounted between engine 13 and fan 18, have axially aligned pintles 24 and 25 extending outwardly from their respective ends, and the outer pintles 24 are journaled in the cowl 15 while the inner pintles 25 are journaled in a stationary flanged ring 26 which is secured to the crankcase of engine 13. It will thus be noted that the contravanes 19 may be swiveled about their pintles 24—25, somewhat like the blinds of a shutter, to change the relative velocity and direction of the airstream entering inlet 16 before it passes through the blades of the fan 18.

The inner pintles 25 of contravanes 19, which are journaled in the stationary flanged ring 26 on motor 13, each carry an arm 28 integral or rigid therewith, and each such arm 28 contains a slot 29 into which is fitted a pin 30 carried by the fixed ball race 31 of a thrust bearing 32 which is fastened to the hub 20 of fan 18, as shown in Fig 2. Accordingly, whenever the fan 18 moves longitudinally on the splines 21 due to variations in the thrust produced by said fan, the fixed (non-rotatable) ball race 31 of thrust bearing 32 will move longitudinally with the fan, and the resulting movement of pins 30 in the slots 29 of arms 28 will cause said arms 28 and the attached contravanes 19 to pivot upon the pintles 24—25 to vary the flow of cooling air over the engine.

The longitudinal thrust of the fan 18 is biased as desired by any suitable means such as biasing springs 34 coiled about guide pins 35 which are secured to the stationary flanged ring 26 and extend freely through holes in the non-rotatable ball race 31, the said springs 34 being compressed between ring 26 and ball race 31 and thus tending to urge the fan 18 toward the right as viewed in Figs. 1, 2 and 3. In operation, any increase in the thrust of fan 18 will result in a pivotal movement of the contravanes 19 and thus produce a compensating change in the relative velocity and direction of the airstream passing through the blades of fan 18 so that the pressure rise may be kept constant regardless of variations in altitude The embodiment of the invention shown in Fig 4. differs from that described above in that it includes additional means for varying the tension of the springs 34 which bias the contravanes 19 in accordance with variations in the pressure of the ambient air, such as occur with changes in altitude. In the form illustrated, the springs 34 are compressed between the non-rotatable ball race 31 and a movable plate 37 having pins 38 freely mounted in holes formed in a stationary bracket 39 secured to the engine crankcase, as shown in Fig. 4. The plate 37 is adapted to move longitudinally of the drive shaft 23, and this movement is controlled by a bell crank lever 40 having its fulcrum 41 on the stationary bracket 39 and one arm pivoted at 42 to movable plate 37 and the other arm pivoted at 43 to the piston 44 of a fluid pressure motor such as the servomotor 45.

The fluid pressure motor 45 is actuated by an atmospheric pressure responsive device comprising an evacuated bellows 47, a compression spring 46, and a bellows 70. Bellows 70 is subjected to atmospheric pressure, or the pressure of the air flowing over the aircraft, by a pipe 72. A head or plate 74 positioned between and attached to both bellows is shifted upwardly, against the force of spring 46, in response to an increase in atmospheric pressure in bellows 70. A decrease in atmospheric pressure in bellows 70 enables spring 46 to move the plate 74 downwardly. These movements of plate 74 are transmitted to bell crank 40, with increased force, by the servomotor 45. Thus, bell crank 40, and consequently the spring loading plate 37, will be positioned in accordance with the position of bellows plate 74, or in accordance with the pressure of the ambient air. As the altitude of the aircraft increases and the atmospheric pressure decreases the resultant downward movement of plate 74 actuates valve 56 of the servomotor and causes the servomotor piston 44 to increase the loading or compression of springs 34. The converse occurs with a decrease in altitude.

Servomotor 45 may be of the type disclosed in Beardsley and Laubin application Serial No. 606,127, filed July 20, 1945. As illustrated in Fig. 4, the piston 44 of the servomotor 45 has one end pivotally secured at 43 to the bell crank lever 40 and the other end pivoted at 48 to a lever 49, and this lever 49 is secured by pin and slot connections at 50 to the bellows rod 51 and at 52 to a split ring or collar 53. The collar 53 is suitably mounted to slide on the stem 54 of the servo valve 56 between limits determined by a flange 57 on the stem and a light compression spring 58 acting between the collar 53 and a flange 59 on the end of the stem 54.

Piston 44 is actuated by oil under pressure admitted through ports at the end of the stem 54.

Piston 44 is actuated by oil under pressure admitted through ports 60, 61 to one or the other side of the piston. Oil is supplied to the pressure line 62 from the pressure side of the engine lubricating system, or directly from an engine driven oil pump, and is admitted to one or the other of the ports 60, 61, depending upon the axial position of valve 56. As pressure oil is admitted by the valve to the cylinder on one side of the piston, through one of the ports 60, 61, the oil is simultaneously permitted to drain from the other side of the piston through the other of said ports 60, 61. Drain lines 64, 65 may be provided for receiving the drain oil. If desired, a suitable flow restriction may be inserted in the pressure line 62 to limit the rate of flow of the pressure oil.

The parts are so arranged that piston 44 will assume a position dependent upon the position of control rod 51 when pressure oil is being supplied to line 62. A slight movement of the control rod 51 in one direction will cause a displacement of the valve 56 in the opposite direction which will admit pressure oil to one side or the other of piston 44 and cause it to move in the same direction as the initial movement of rod 51. As piston 44 moves, however, it returns the valve 56 to its central or closed position and thus movement of piston 44 will be stopped after it has been displaced in an amount corresponding with the original displacement of control rod 51.

Although certain specific embodiments have been shown and described herein for purposes of illustration, it will be evident to those skilled in the art that the invention is capable of various other modifications and adaptations within the scope of the appended claims.

What is claimed is:

1. Axial flow fan apparatus, comprising means defining a passageway through which a gaseous fluid may pass, a rotary fan having constant pitch blades in said passageway for controlling and boosting gaseous flow therethrough, a shaft extending longitudinally of said passageway on which said fan is mounted, means mounting said fan for rotation with said shaft and for solely substantially axial movement in respect thereto, a plurality of angularly adjustable contravanes in said passageway upstream from the point of view of the direction of gaseous flow therethrough from said fan, resilient means tending to urge said fan in a downstream direction along said shaft, and means actuated by movement of said fan along said shaft in an upstream direction in response to the thrust of said fan and in opposition to said resilient means for controlling the angular positions of said contravanes.

2. Axial flow fan apparatus, comprising means defining a passageway through which a gaseous fluid may pass, a rotary fan having constant pitch blades in said passageway for controlling gaseous flow therethrough, a shaft extending longitudinally of said passageway on which said fan is mounted, means mounting said fan and said shaft and so constructed and arranged that said fan may move axially under the influence of the thrust thereof, a plurality of angularly adjustable contravanes in said passageway upstream from the point of view of the direction of gaseous flow therethrough from said fan, resilient means tending to oppose movement of said fan in an axial direction in response to the thrust thereof, and means actuated by axial movement of said fan in an upstream direction in response to the thrust of said fan and in opposition to said resilient means for controlling the angular positions of said contravanes.

3. Axial flow fan apparatus, comprising means defining a passageway through which a gaseous fluid may pass, a rotary fan having constant pitch blades in said passageway for controlling and boosting gaseous flow therethrough, means mounting said fan for movement in an axial direction in response to the thrust of said fan, a plurality of angularly adjustable contravanes in said passageway upstream from the point of view of the direction of gaseous flow therethrough from said fan, and means actuated by axial movement of said fan in response to the thrust thereof for controlling the angular positions of said contravanes.

4. Axial flow apparatus, comprising means defining a passageway through which a gaseous fluid may pass, a rotary fan having constant pitch blades in said passageway for controlling and boosting gaseous flow therethrough, a shaft extending longitudinally in said passageway on which said fan is mounted, means including splines on said shaft mounting said fan for rotation with said shaft and for solely axial movement in respect thereto along said splines, thrust bearing means having one part movable in rotation and axially with said fan and another part movable therewith in an axial direction only, spring means for urging the said other part of said thrust bearing means in a downstream direction, a plurality of angularly adjustable contravanes in said passageway upstream from said fan, and means mechanically interconnecting said other part of said thrust bearing means and said contravanes and so constructed and arranged that axial movement of said fan in an upstream direction in response to the thrust of said fan will be effective to control the angular positions of said contravanes.

5. Axial flow fan apparatus, comprising means defining a passageway through which a gaseous fluid may pass, a rotary fan having constant pitch blades in said passageway for controlling and boosting gaseous flow therethrough, means mounting said fan for movement in an axial direction in response to the thrust of said fan, a plurality of angularly adjustable contravanes in said passageway upstream from the point of view of the direction of gaseous flow therethrough from said fan, means responsive to barometric pressure for affecting the axial movement of said fan under the influence of the thrust thereof, and means actuated by axial movement of said fan for controlling the angular positions of said contravanes.

6. Axial flow fan apparatus, comprising means defining a passageway through which a gaseous fluid may pass, a rotary fan having constant pitch blades in said passageway for controlling and boosting gaseous flow therethrough, a shaft extending longitudinally of said passageway on which said fan is mounted, means mounting said fan for rotation with said shaft and for solely substantially axial movement in respect thereto, a plurality of angularly adjustable contravanes in said passageway upstream from the point of view of the direction of gaseous flow therethrough from said fan, resilient means tending to urge said fan in a downstream direction along said shaft, means responsive to barometric pressure for affecting the axial movement of said fan under the influence of the thrust thereof, and means actuated by movement of said fan along said shaft in an upstream direction in opposition to said resilient means for controlling the angular positions of said contravanes.

7. Axial flow fan apparatus, comprising means defining a passageway through which a gaseous fluid may pass, a rotary fan having constant pitch blades in said passageway for controlling and boosting gaseous flow therethrough, a shaft extending longitudinally in said passageway on which said fan is mounted, means including splines on said shaft mounting said fan for rotation with said shaft and for solely axial movement in respect thereto along said splines, thrust bearing means having one part movable in rotation and axially with said fan and another part movable in an axial direction only, spring means for urging the said other part of said thrust bearing means in a downstream direction, means subject to barometric pressure, a servomotor actuated by said barometric pressure responsive means, means operated by said servomotor for controllably varying the loading of said spring means and thereby for affecting the movement of said fan under the impulse of the thrust thereof in an axial direction, a plurality of angularly adjustable contravanes in said passageway upstream from said fan, and means including a cam for mechanically controlling the angular positions of said contravanes in response to axial movement of said other part of said thrust bearing.

8. Axial flow fan apparatus, comprising means defining a passageway through which a gaseous fluid may pass, a driving shaft, a rotary fan having constant pitch blades arranged in said passageway for controlling and boosting gaseous flow therethrough, said fan being mounted on said shaft and being constrained to rotate therewith but being movable longitudinally on said shaft, means for varying the relative velocity and direction of the air stream flowing through said passageway comprising a plurality of adjustable contravanes, means for biasing the adjustment of said contravanes, and means responsive to movement of said fan longitudinally of said shaft in response to variation in the thrust of said fan for adjusting said contravanes.

9. Axial flow fan apparatus in accordance with claim 8, comprising in addition. means responsive to variations in atmospheric pressure for controlling the biasing of said contravanes.

DONALD S. HERSEY.

REFERENCES CITED

The following references are of record in the file of this patent:

UNITED STATES PATENTS

| Number | Name | Date |
|---|---|---|
| Re. 20,668 | Seelig | Mar. 8, 1938 |
| 794,984 | Huber | July 18, 1905 |
| 1,170,730 | Benjamin et al. | Feb. 8, 1916 |
| 1,830,858 | Schoepp et al. | Nov. 10, 1931 |
| 2,032,224 | Paton | Feb. 25, 1936 |
| 2,149,267 | Bouvy et al. | Mar. 7, 1939 |
| 2,336,010 | Gregory et al. | Dec. 7, 1943 |
| 2,337,861 | Adamtchik | Dec. 28, 1943 |
| 2,347,153 | Hagen et al. | Apr. 18, 1944 |
| 2,384,088 | Hagen | Sept. 4, 1945 |